United States Patent [19]

Lemke

[11] Patent Number: 5,069,589
[45] Date of Patent: Dec. 3, 1991

[54] STRESS PLATE FOR ROOF MEMBRANE FASTENER ASSEMBLY

[76] Inventor: Stuart H. Lemke, 413 4th St., Mosinee, Wis. 54455

[21] Appl. No.: 455,832

[22] Filed: Dec. 15, 1989

Related U.S. Application Data

[63] Continuation of Ser. No. 236,542, Feb. 25, 1988, abandoned.

[51] Int. Cl.⁵ ............................ F16B 43/00; E04B 7/00
[52] U.S. Cl. ............................ 411/533; 411/368; 411/160; 411/82; 411/258; 52/410
[58] Field of Search ........ 411/368, 160, 161, 186–188, 411/171, 531, 533, 143–147, 82, 258, 908, 461–464, 466, 542, 915; 52/410, 512

[56] References Cited

U.S. PATENT DOCUMENTS

| 884,290 | 4/1908 | de Oca | 411/143 |
| 2,046,949 | 7/1936 | Horner | 411/461 |
| 3,179,143 | 4/1965 | Schultz | 411/82 |
| 4,056,645 | 11/1977 | Henry | 411/531 |
| 4,361,997 | 12/1982 | DeCaro | 411/161 |
| 4,726,164 | 2/1988 | Reinwall | 411/533 |
| 4,763,456 | 8/1988 | Giannuzzi | 52/512 |
| 4,780,039 | 10/1988 | Hartman | 411/533 |
| 4,787,188 | 11/1988 | Murphy | 52/410 |

FOREIGN PATENT DOCUMENTS 2711335 9/1978 Fed. Rep. of Germany ........ 52/410

Primary Examiner—Rodney M. Lindsey
Assistant Examiner—Flemming Saether
Attorney, Agent, or Firm—Lang Streich

[57] ABSTRACT

A disc-shaped stress plate to be utilized with a fastener having an elongated shank integral with a disc-shaped head includes a disc having an upper and lower surface with an indentation in the upper surface and a protrusion on the lower surface. The disc can also be provided with a plurality of gripping teeth on its bottom surface and a plurality of friction enhancing protrusions on its upper surface.

17 Claims, 3 Drawing Sheets

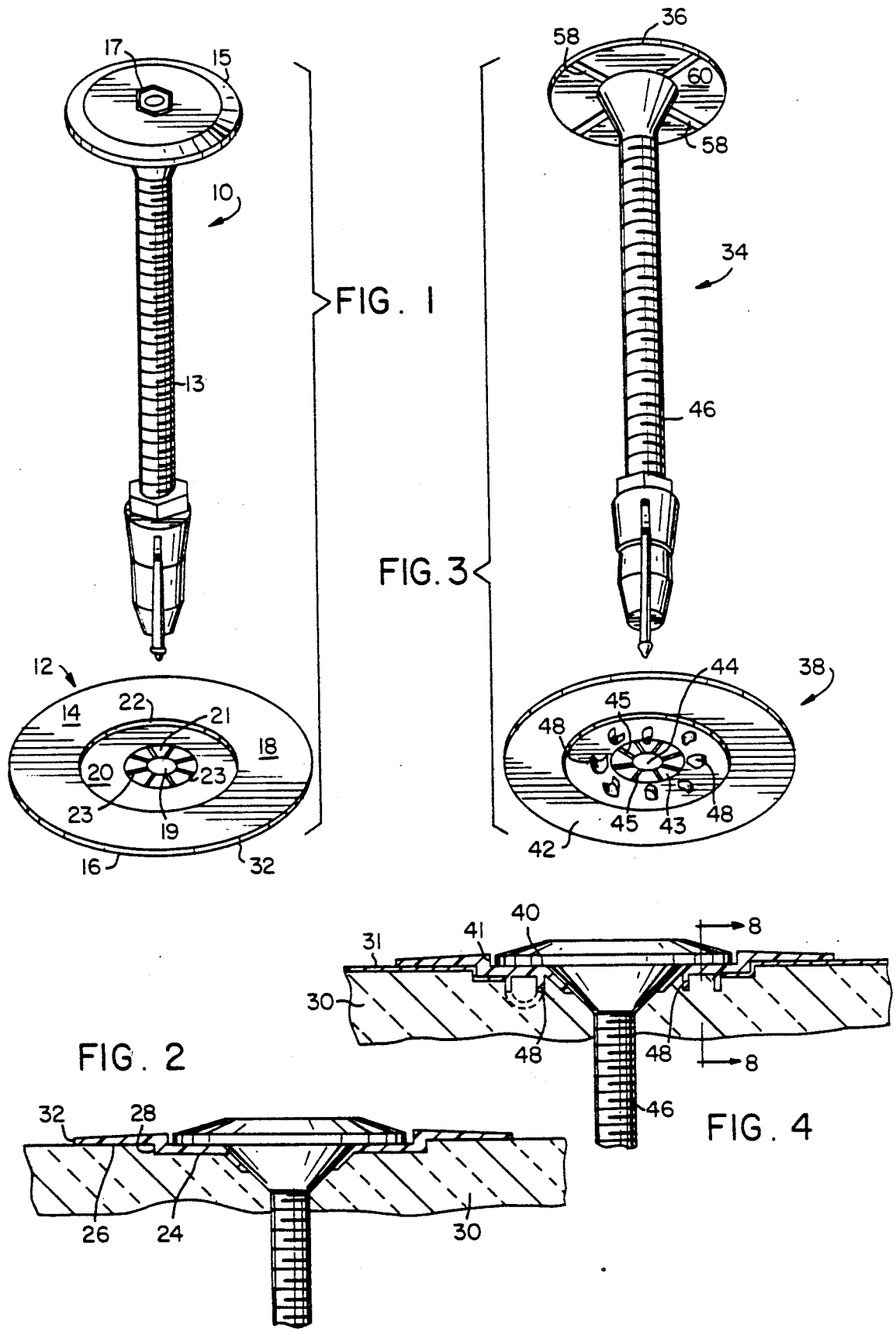

STRESS PLATE FOR ROOF MEMBRANE FASTENER ASSEMBLY

This is a continuation of application Ser. No. 236,542 filed Feb. 25, 1988, abandoned.

BACKGROUND OF THE INVENTION

The present invention relates to a roofing disc to be utilized with a fastener and more particularly to a disc to be utilized in the securing of insulation or roof membranes to a roof deck structure.

It is quite common in the roofing industry for new roof installation to utilize wood, metal, structural, cement fiber and lightweight concrete decks to which is secured a layer of insulation which may in turn be covered by a roof membrane.

These layers are secured to each other by use of an elongated fastener that typically has an enlarged disc-shaped head which serves as a stress plate. When utilized with insulation having a lightweight brittle-type skin, it was necessary to compress the insulation board when installing the fastener in order to determine that the fastener was completely tightened. When approaching this point, it was very possible to strip out the underlying deck material and cause the fastener to lose valuable holding power or pull-out resistance. It was also possible that when the fastener was tightened to this extent that the edge of the fastener head could cut or break through the insulation skin which would also lead to less pull over resistance for the insulation.

Another situation frequently encountered in the roofing industry, is that in high winds the roofing membranes would have a tendency to tear and slide out from beneath the stress plate. This is referred to by the industry as side tear.

With other insulating materials that utilize cured rubber membranes, the rubbery material would have a tendency to pull or wrinkle when the fastener came into contact with it as it was rotated into the roofing structure. This wrinkling is unacceptable especially in a situation where the membrane must be seamed to an adjoining membrane.

SUMMARY OF THE INVENTION

A stress plate to be utilized with a fastener having an elongated shank integral with a disc-shaped head includes a disc of flexible material having an upper and lower surface and a centrally located hole through which the fastener shank passes.

In accordance with one aspect of the invention, the upper surface has a radially outer portion extending axially outwardly from a radially inner portion so that a vertical lip is formed on the upper surface joining the two portions.

In accordance with another aspect of the invention, the lower surface has a radially inner portion extending axially outwardly from a radially outer portion so that a vertical step is formed on the lower surface joining the two portions.

In accordance with yet another aspect of the invention, the radially inner portion of the upper surface has a diameter substantially the same as the diameter of the fastener head.

In another embodiment of the invention, a disc-shaped washer is provided with a plurality of gripping teeth extending from a lower surface of the disc.

In accordance with one aspect of the invention, an upwardly extending circular lip is provided integral with the upper surface to prevent lateral movement of the disc-shaped fastener head.

In accordance with another aspect of the invention, the teeth have a sharp point in order to puncture the roof membrane so as to enhance its holding power.

In accordance with still another aspect of the invention, gripping teeth are provided in the form of peaked cups.

In accordance with yet another aspect of the invention, the sharp gripping teeth are disposed in a double staggered row about the bottom surface of the disc.

BRIEF DESCRIPTION OF THE DRAWINGS

The drawings illustrate the best mode presently contemplated of carrying out the invention.

In the drawings:

FIG. 1 is a perspective view of a fastener and stress plate of the present invention in an unassembled state;

FIG. 2 is a side cross sectional view of the fastener and stress plate of FIG. 1 in an assembled state;

FIG. 3 is a perspective view of a fastener and slip washer constructed according to the present invention in an unassembled state and showing the bottom surfaces of the fastener head and the slip washer;

FIG. 4 is a side cross sectional view of the fastener and slip washer of FIG. 3 in an assembled state;

DESCRIPTION OF THE PREFERRED EMBODIMENT

Figure 5:
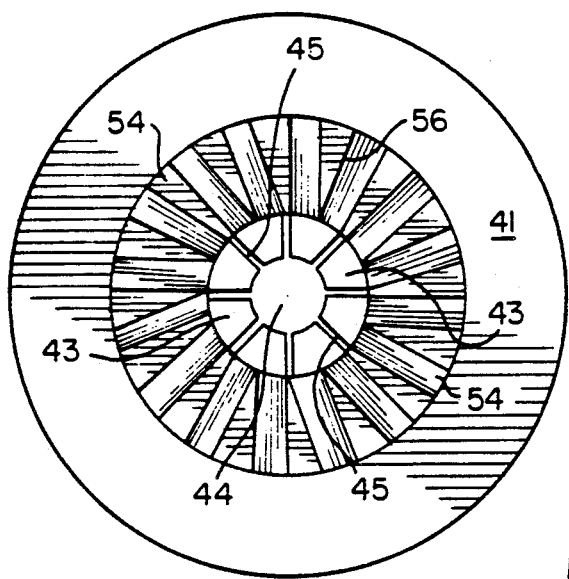
FIG. 5 is a plan view of the upper surface of the slip washer of FIG. 3.
Figure 6:
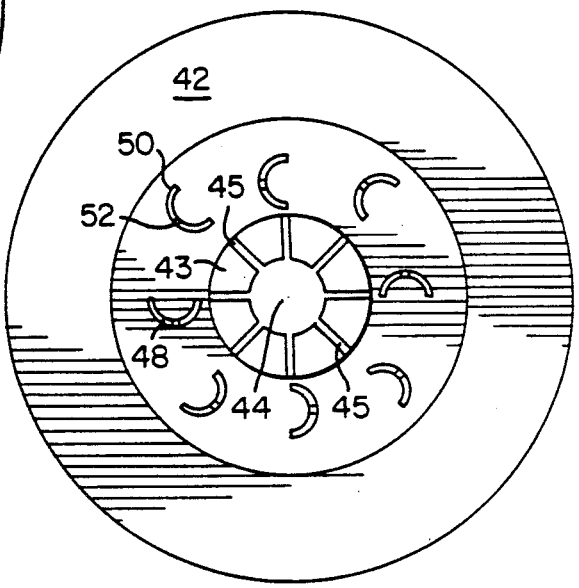
FIG. 6 is a plan view of the bottom surface of the slip washer of FIG. 3.

FIG. 1 illustrates a fastener 10 and a stress plate 12 particularly designed to be utilized with insulation roofing materials in which the insulation has a lightweight brittle skin. Fastener 10 includes an elongated threaded shank 13 and a disc-shaped head 15 having a centrally located tool engaging opening 17. When a fastener of this type was torqued down into a tightened position with insulation of this type, the insulation would be compressed and this often resulted in a stripping out of the fastener from the deck material which in turn caused the fastener to lose valuable holding power. The compression of the insulation material could also result in the edge of fastener head 15 breaking the insulation surface which would also result in less pull over resistance.

Stress plate 12 is designed to provide an indication of fastener tightness while eliminating the disadvantages discussed above.

As seen in FIG. 1, stress plate 12 is made of a flexible material and has an upper surface 14, a lower surface 16 and a centrally located hole 19 through which fastener shank 13 passes. The disc material 21 surrounding hole 19 is cut with a series of slits 23 that extend radially outwardly from hole 19 and provide a feathered area around hole 19 which facilitates the centering of fastener 10 on stress plate 12.

Upper surface 14 is provided with a radially outer portion 18 and a radially inner portion 20. Radially outer portion 18 extends axially outwardly from radially inner portion 20 so that a vertical lip 22 is provided on upper surface 14.

The diameter of radially inner portion 20 is substantially the same as the diameter of disc-shaped fastener head 15 so that when assembled, vertical lip 22 contains fastener head 15 and prevents lateral movement of fastener head 15.

Lower surface 16 is provided with a radially inner portion 24 and a radially outward portion 26. Radially inner portion 24 is axially offset from radially outer portion 26 so that a step 28 is provided on lower surface 16. The diameter of radially inner portion 24 is substantially the same as that of radially inner portion 20 on upper surface 14.

When fastener 10 is rotated into the roofing material it engages stress plate 12 and stress plate 12 countersinks into the surface of insulating material 30. The flexible material of stress plate 12 then becomes slightly concave which indicates that the fastener is completely tightened down. Thus, stress plate 12 gives an indication of fastener tightness without stripping the fastener out of the materials below. Since fastener 10 does not come into direct contact with insulation 30 and since edge 32 of plate 12 is forced upwardly by the tightening of fastener 10 neither the edge of the fastener head 15 nor edge 32 of stress plate 12 will cut or break through the surface of insulation 30.

FIG. 3 illustrates a disc particularly adapted to be utilized in roofing installations utilizing a roof membrane 31 that is particularly flexible. It has been found that the use of a fastener 34 having an integral stress plate 36 with insulation materials of this type causes an unacceptable wrinkling of the membrane when fastener 34 is tightened.

In order to prevent this wrinkling, a slip washer 38 is provided which has an upper surface 40, a lower surface 42 and a centrally located hole 44 through which fastener shank 46 passes. The washer material 43 surrounding hole 44 is cut with a series of slits 45 that extend radially outwardly from hole 44 and provide a feathered area around hole 44 which facilitates the centering of fastener 34 on slip washer 38.

Upper surface 40 is provided with an upwardly extending circumferential lip 41 that contains fastener head 36 and inhibits lateral movement of fastener 34.

Figure 7:
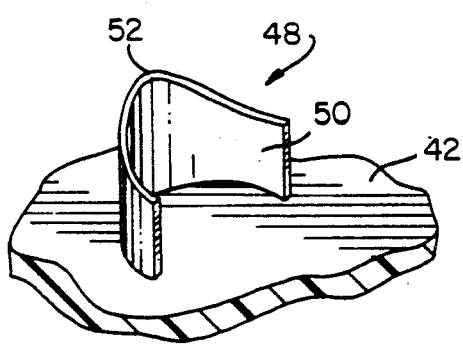
FIG. 7 is an enlarged perspective view of the gripping tooth of the slip washer of FIG. 6.

Lower surface 42 is provided with a plurality of gripping teeth 48 that are integral with and extend from lower surface 42. Teeth 48 are disposed in a pair of circles about lower surface 42 and are staggered so that the teeth do not radially align and as shown in FIG. 7 each of teeth 48 is in the form of an arcuate cup 50 having a peak 52 which allows the tooth to puncture the membrane. The cup-shape configuration tends to gather material and thus inhibit side tear of the insulation.

Figure 8:
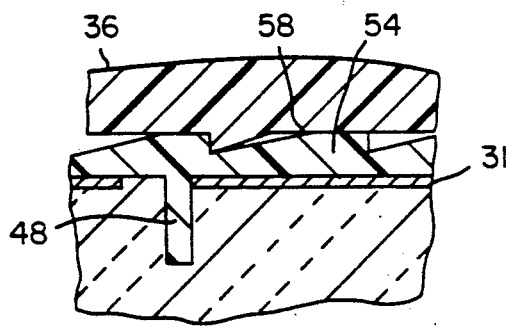
FIG. 8 is a sectional view taken along the line 8—8 of FIG. 4.

As shown in FIGS. 5 and 8 upper surface 40 of slip washer 38 is provided with a series of tapered steps 54 that extend radially outwardly from feathered area 43. Steps 54 provide a series of abutments or ratchets 56 for protrusions 58 extending downwardly from the bottom surface 60 of stress plate 36. As fastener 34 is rotated into position, protrusions 58 come into contact with steps 54 and the heat caused by the friction of the interaction causes the protrusions to melt down and form a bond between stress plate 36 and the surface of slip washer 38. This bond further inhibits counter rotation of fastener 34. This bond can be further enhanced by spreading a layer of adhesive (not shown) between stress plate 36 and slip washer 38.

Figure 9:
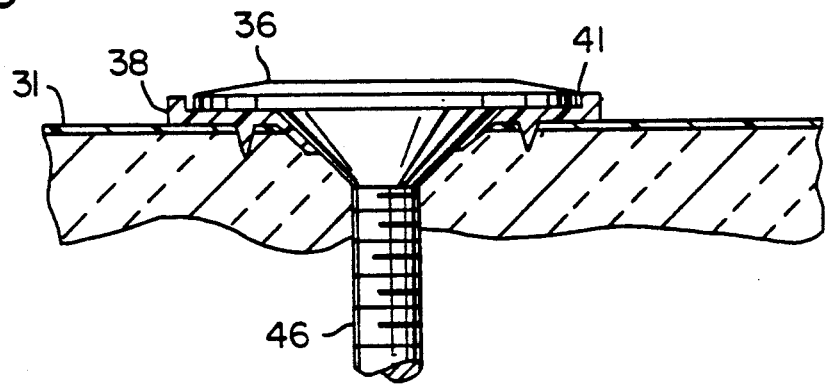
FIG. 9 is a side cross sectional view of a fastener and alternate embodiment slip washer in an assembled state.

FIG. 9 illustrates an alternate embodiment of slip washer 38 in which the outer portion of the bottom surface 62 is provided with a series of circumferential ribs 64 and gripping teeth 66 are in the form of inverted cones having their points 68 extending downwardly from bottom surface 62. Teeth 66 are disposed in a pair of circles along bottom surface 62 and are staggered so that the teeth of the inner circle 70 do not radially align with those of the outer circle 72. During installation points 68 will pierce membrane skin 31 to provide more side tear resistance.

Figure 10:
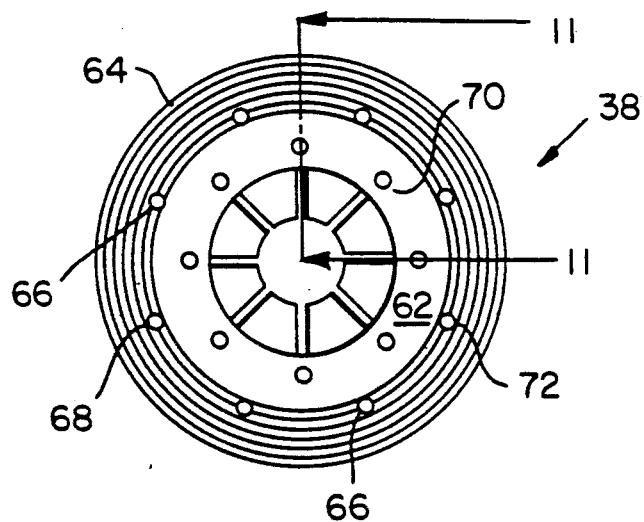
FIG. 10 is a plan view of the bottom of the slip washer of FIG. 9.
Figure 11:
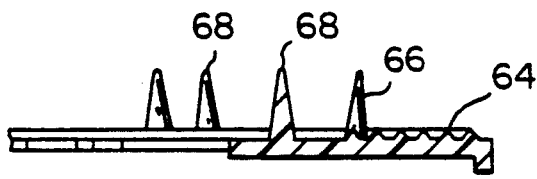
FIG. 11 is a sectional view taken along the line 11—11 of FIG. 10.

Referring to FIGS. 10 and 11, ribs 64 are of annular shape and concentric with each other. The series of ribs 64 is positioned adjacent the outer periphery of washer (stress plate) 38. Ribs 64 extend in the same direction as teeth 66, are shorter than teeth 66, and cooperate therewith in engaging a roof membrane.

Various modes for carrying out the invention are contemplated as being within the scope of the following claims particularly pointing out and distinctly claiming the subject matter which is regarded as the invention.

I claim:

1. A stress plate adapted for use with a fastener, which fastener has an elongated shank and an enlarged diameter head at one end of said shank, for securing a roof membrane to a roof deck, said plate having:
   top and bottom surfaces,
   a central hole configured to allow the fastener shank to fit therethrough but of lesser diameter than the fastener head;
   a formation of upright, pointed teeth extending from said bottom surface; and
   a series of non radial ribs extending from said bottom surface, which ribs are shorter than said teeth.

2. The stress plate of claim 1, wherein said ribs are circumferential.

3. The stress plate of claim 2, wherein said ribs are annular.

4. The stress plate of claim 3, wherein said ribs are concentrically disposed about said central hole.

5. The stress plate of claim 1, wherein said teeth are staggered in the radial direction of said disk.

6. The stress plate of claim 5, wherein said formation of teeth comprises a pair of radially spaced, concentric circles.

7. The stress plate of claim 2, wherein said plate further has a series of diverging slits extending radially outwardly from said hole inwardly of said teeth and forming a feathered portion of said plate about said hole.

8. The plate of claim 7, wherein said plate further includes stepped means disposed on said top surface radially outwardly from said feathered portion engagable with protrusions on an undersurface of the fastener head for hindering disengagement of the fastener with said plate.

9. The plate of claim 8, wherein said top surface has an upwardly extending circumferential lip into which the fastener head fits when the fastener is fully inserted into said hole in said plate.

10. The plate of claim 1, wherein said plate is made of a flexible plastic and is disc-shaped.

11. The stress plate of claim 1, wherein an outermost one of said ribs is disposed near the outer peripheral edge of said disk, and the remainder of said ribs are disposed on an outer portion of said bottom surface at positions radially inwardly spaced from said outermost rib.

12. The stress plate of claim 1, wherein said plate further has means for interlocking with the fastener.

13. A stress plate adapted for use with a fastener, which fastener has an elongated shank and an enlarged diameter head at one end of said shank, for securing a roof membrane to a roof deck, said stress plate having:
generally flat, top and bottom surfaces;
a central hole configured to allow the fastener shank to fit therethrough but having a lesser diameter than the fastener head;
a formation of pointed teeth extending from said bottom surface disposed in at least two, inner and outer circles concentrically disposed about said central hole, said teeth being staggered in the radial direction of said disk; and
a series of annular ribs shorter than said teeth and concentrically disposed about said central hole, said ribs extending from said bottom surface in radially spaced positions outwardly of said inner circle of teeth.

14. The stress plate of claim 13, wherein the teeth of said outer circle are disposed among and interrupt said series of ribs.

15. The stress plate of claim 13, wherein said stress plate is made of a flexible plastic.

16. The stress plate of claim 13, wherein said stress plate is disk-shaped.

17. The stress plate of claim 13, wherein said teeth are shaped as inverted cones.

* * * * *